I. M. Newcomb,
Drag Saw.
Nº 13,040.   Patented June 12, 1855.
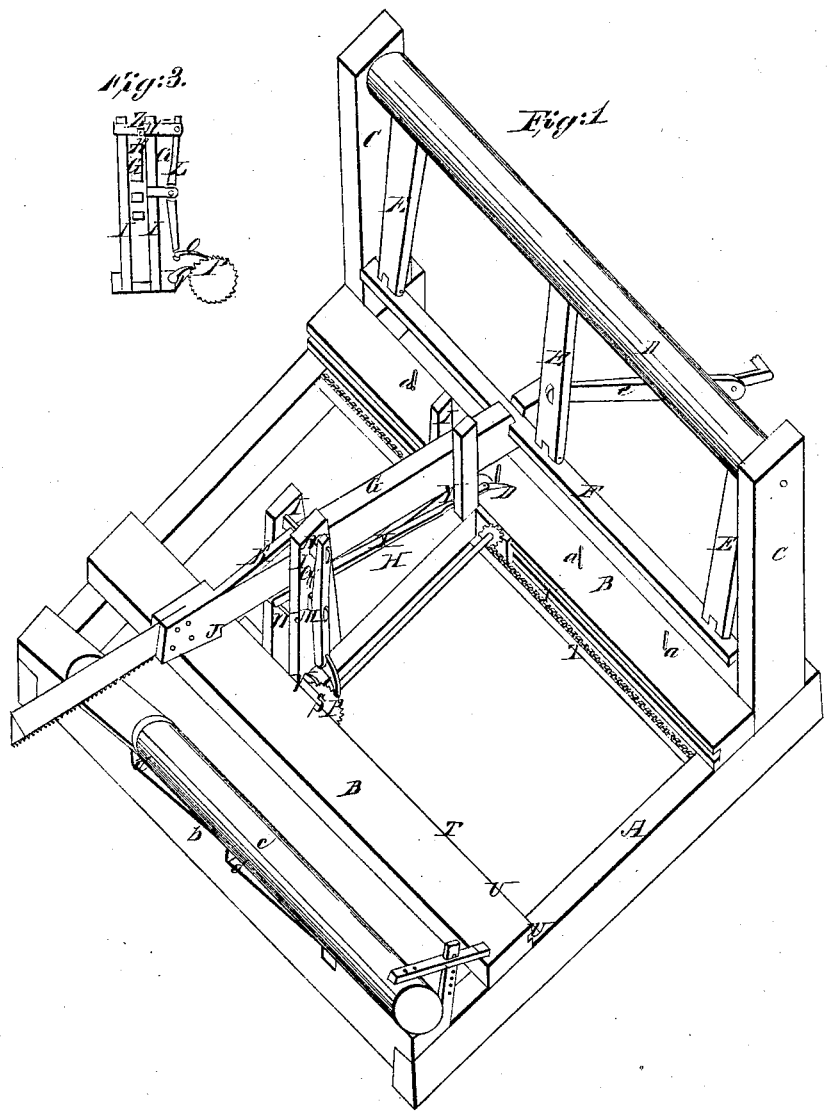
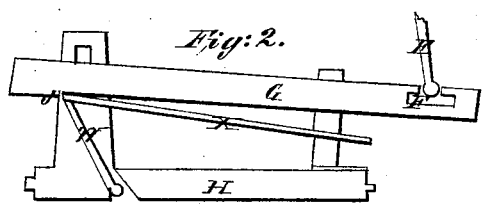
Witnesses:
Amasa Stevens
James Brown
Inventor:
Isaac M. Newcomb

UNITED STATES PATENT OFFICE.

ISAAC M. NEWCOMB, OF EDEN, VERMONT.

SAWING-MACHINE.

Specification of Letters Patent No. 13,040, dated June 12, 1855.

*To all whom it may concern:*

Be it known that I, ISAAC M. NEWCOMB, of Eden, in the county of Lamoille and State of Vermont, have invented a new and useful Self-Setting, Reciprocating, Horizontal Crosscut-Sawing Machine for Sawing Fire-Wood, Stave and Shingle Timber, &c.; and I do hereby declare that the following is a full, clear, and exact description of the same, reference being had to the annexed drawings, making a part of this specification, in which—

Figure 1, is a perspective view. Fig. 2 is a vertical longitudinal section through the carriage, showing the attachment of the saw shaft to the vibrating frame, and also the lifting arm and catch rod for lifting and retaining the saw above the log; the dotted lines show the position of the lifting arm and catch rod when the saw rests upon the log. Fig. 3 is a vertical transverse section of the carriage through the forward arms. Fig. 4 is a top view of the catch rod and the finger spring at its back end, and also the hook locked upon the arm.

The nature of the invention consists, first, in the employment of a vibrating frame, to which the saw shaft is secured in such a manner that the saw is allowed to move horizontally, at right angles to the line of its reciprocating motion from end to end of the log in setting while the log remains stationary; second, a carriage moving on ways parallel with the log, and provided with vertical guide arms at each end, between which the saw shaft plays, also an arm and catch, for lifting the saw after a cut is made, and retaining it above the log while the carriage and saw are moved into position for the next cut by machinery to be hereafter described.

To enable others skilled in the art to make and use my invention, I will proceed to describe its construction and operation.

A, A, Fig. 1, are bedsills and B, B, cross timbers upon which the working parts of the machinery rest; C C are posts in the upper ends of which shaft D, has its bearings; E, E, E, are parallel arms to the outer ends of which bar F, is secured by a hinge joint at or near the center of its width; G, is the saw shaft, which plays between, and is guided by the arms I, I, I, I, of the carriage H, and is secured by a notch with projecting lips to bar, F, of the vibrating frame, D, E, F, in such a manner that it may be moved from end to end of the bar F, and not come in contact with the arms E, E, E. The connection of the shaft G, to the bar F, is shown at F, Fig. 2, and also its relation to the arms E.

J is a projection or hook from the under side and near the forward end of the shaft G; K is a tongue, running obliquely across the upper side of shaft G in a distance corresponding with the length of the saw's stroke.

L, is a lever, whose fulcrum is at M; it is connected at its upper end to the slide N, and at its lower end to ratchet O, which takes into the teeth of ratchet wheel P; Q, is a spring; R, is a shaft having its bearings in projections from each end of the carriage H; upon said shaft ratchet wheel P, is secured, and also the pinion wheels S, S, which mesh with the teeth of the stationary racks T, T; U, U, are ways upon the cross timbers B, B, between which the carriage H moves; V is a pawl; W, is a lifting arm secured at its lower end to the carriage by a pin, in such a manner that its upper end, which is connected to the forward end of the catch rod X by a hinge joint may be moved in the arc of a circle. The catch rod X, runs back between the arms at the back end of the carriage where it has a hook upon one edge, and a spring Y, upon the other, by which the hook is made to lock upon arm I; there is also secured on the back end of the catch rod a finger Z having a limited motion.

*a, a, a,* are pins set in holes along the cross timber B, at a distance from each other, corresponding to the length of timber into which the log is to be cut.

*b,* is a bed timber on which the log *c,* is secured.

*d* are notches in the bed timber, which allow the blocks as they are cut off to fall away from the saw, thereby preventing it being bound in its kerf.

Operation: A reciprocating motion being given to the frame *d, e, f,* by the crank rod *e,* or otherwise, the saw being raised above the log and retained by the arm *w,* and catch rod *x.* The tongue *k,* is in the notch of the slide *n,* shown at *n,* Fig. 3, which following the oblique tongue, receives a traverse motion, which is communicated, through the lever L, to ratch O, which takes into the teeth of the ratchet wheel P, which it operates, and allows the pawl to gather a tooth at every forward motion of the saw, and thereby gives a rotary motion to the pinions S S, which mesh with the teeth of the stationary racks T, T (one not shown) thereby causing the carriage to move along the ways until the finger Z comes in contact with a pin, a, and is brought into a line with the catch rod X, when it unlocks the catch rod X from the arm I and allows the catch rod X, and arm W, to fall forward into the position shown by the dotted lines in Fig. 2, and the saw to rest upon the log, upon which it operates until the cut is made, when the hook J, catches the forward end of the catchrod X, and by its backward motion lifts the saw from the log, when the hook at the back end of the catchrod locks upon the arm I, and retains it until the finger Z comes in contact with the next pin, when the catchrod is again unlocked and the saw again let to operate upon the log, the machine thus acting automatically until the log is all cut into blocks of the required length, when by ungearing the ratch and pawl, the carriage may be run back into position to commence on the next log, by pins in the side of the ratchet wheel, or by a rope and windlass.

I usually construct my machine of wood and iron, but in large works the working parts may be entirely of iron.

The advantages of my machine over others in common use are, first, it saves manual labor; second, the work is done in a superior manner, as the cuts are all made parallel; the log is also more easily secured.

What I claim as my invention and desire to secure by Letters Patent is—

1. The bar F, secured to the arms E, of the vibrating frame by a hinge joint, and its connection with the saw shaft, combined and operating substantially as specified.

2. I also claim the guide arms of the carriage H combined and operating as described.

3. And I also claim the lifting arm W and catches X combined with the hook S of the saw shaft G also the oblique tongue K and notched slide, N, combined and operating substantially as described.

ISAAC M. NEWCOMB.

Witnesses:
AMASA STEVENS,
JAMES BROWN.